United States Patent
Takamoto et al.

(10) Patent No.: US 7,070,019 B2
(45) Date of Patent: Jul. 4, 2006

(54) POWER ASSISTED STEERING FOR ALL TERRAIN VEHICLE

(75) Inventors: David T. Takamoto, Placentia, CA (US); Jack R. Auld, Laguna Niguel, CA (US); John C. Dunne, Jr., Costa Mesa, CA (US); Harry Adam Dupre, III, Anaheim, CA (US); Eric N. Anderfaas, Westminster, CA (US); Dean W. Banks, Costa Mesa, CA (US); Gregory E. Mott, Fairmont, WV (US)

(73) Assignee: Yamaha Motor Corporation USA, Cypress, CA (US)

( * ) Notice: Subject to any disclaimer, the term of this patent is extended or adjusted under 35 U.S.C. 154(b) by 0 days.

(21) Appl. No.: 10/178,903

(22) Filed: Jun. 21, 2002

(65) Prior Publication Data

US 2003/0051937 A1 Mar. 20, 2003

Related U.S. Application Data

(60) Provisional application No. 60/299,946, filed on Jun. 21, 2001.

(51) Int. Cl.
*B62D 5/00* (2006.01)

(52) U.S. Cl. .................... 180/403; 180/442; 180/438; 180/439

(58) Field of Classification Search ......... 180/417–419, 180/421, 422, 403, 441, 442, 438–440
See application file for complete search history.

(56) References Cited

U.S. PATENT DOCUMENTS

| | | | |
|---|---|---|---|
| 3,131,602 A | 5/1964 | Ford | ............ 91/137 |
| 3,584,592 A | 6/1971 | Perrine | |
| 3,990,534 A | * 11/1976 | Weisgerber | ......... 180/417 |
| 4,155,309 A | 5/1979 | Ames et al. | |
| 4,173,987 A | * 11/1979 | Kouda | ......... 137/625.23 |

(Continued)

FOREIGN PATENT DOCUMENTS

JP    64-074190 A1    3/1989

OTHER PUBLICATIONS

The Motor Vehicle; Twelfth Edition; @1996; Chapter 34, pp. 872–895.
The Motor Vehicle; Twelfth Edition; ®1996; Chapter 34, pp 872–895.

*Primary Examiner*—Lesley D. Morris
*Assistant Examiner*—L. Lum
(74) *Attorney, Agent, or Firm*—Knobbe, Martens, Olson & Bear, LLP

(57) ABSTRACT

An all terrain vehicle has a frame carried by a group of wheels. At least one of the wheels is steerably connected to the frame. A steering handle assembly is rotatably connected to the frame. A servo valve has an input shaft connected to the steering handle assembly and an output shaft connected to a pitman arm. A linkage extends from the pitman arm to the steerable wheel or wheels. A pump draws fluid from a reservoir and passes the fluid through the servo valve before the fluid is returned to the reservoir. The servo valve redirects at least a portion of the flow to a cylinder to drive a ram within the cylinder in response to steering movement of the steering handle assembly. The ram, in turn, provides a power assist to the steerable wheel or wheels. A variable speed, constant displacement pump can be used to vary the flow rate in a manner that reduces the flow rate as the vehicle speed increases. Alternatively, a bypass can be used to vary a flow rate through the servo valve. A damping valve arrangement also can be provided to absorb shocks to the steering system such that the wheels can initially deflect and then return to the original position without substantial input from the steering handle assembly.

38 Claims, 7 Drawing Sheets

U.S. PATENT DOCUMENTS

| | | | |
|---|---|---|---|
| 4,410,059 A * | 10/1983 | Nakayama et al. ......... 180/423 |
| 4,488,615 A | 12/1984 | Millard |
| 4,660,671 A | 4/1987 | Behr et al. |
| 4,681,181 A | 7/1987 | Shimizu |
| 4,702,335 A | 10/1987 | Cage et al. ................. 180/423 |
| 4,712,633 A * | 12/1987 | Suzuki et al. ............... 180/429 |
| 4,796,714 A * | 1/1989 | Momiyama ................. 180/423 |
| 4,800,974 A | 1/1989 | Wand et al. |
| 4,940,103 A * | 7/1990 | Momiyama ................. 180/422 |
| 4,951,199 A | 8/1990 | Whitehead |
| 5,125,490 A * | 6/1992 | Suzumura et al. ............ 477/35 |
| 5,253,730 A | 10/1993 | Hayashi et al. |
| 5,257,672 A * | 11/1993 | Ohtagaki et al. ........... 180/249 |
| 5,322,308 A | 6/1994 | Bishop |
| 5,394,760 A | 3/1995 | Persson et al. |
| 5,419,235 A * | 5/1995 | Gilbert et al. ............. 91/375 R |
| 5,439,070 A * | 8/1995 | Haga et al. ................. 180/421 |
| 5,725,023 A * | 3/1998 | Padula ................... 137/596.17 |
| 5,742,351 A | 4/1998 | Guede |
| 5,906,250 A | 5/1999 | Haga et al. |
| 5,921,343 A | 7/1999 | Yamakaji |
| 5,931,256 A | 8/1999 | Langkamp |
| 5,934,404 A | 8/1999 | DeLellis et al. |
| 6,041,883 A * | 3/2000 | Yokota et al. .............. 180/422 |
| 6,065,561 A * | 5/2000 | Howard ....................... 180/441 |
| 6,182,784 B1 * | 2/2001 | Pestotnik .................... 180/376 |
| 6,196,072 B1 | 3/2001 | Toyohira et al. |
| 6,202,781 B1 | 3/2001 | Ima |
| 6,244,373 B1 | 6/2001 | Kojo et al. ................. 180/443 |
| 6,298,941 B1 * | 10/2001 | Spadafora ................... 180/422 |
| 6,345,544 B1 | 2/2002 | Mizuno et al. |
| 6,390,228 B1 * | 5/2002 | Serizawa et al. ........... 180/403 |
| 6,491,126 B1 | 12/2002 | Robison et al. |
| 6,536,293 B1 | 3/2003 | Shiba |
| 6,622,806 B1 | 9/2003 | Mattsuura |
| 2002/0038737 A1 | 4/2002 | Morishita et al. |
| 2003/0089166 A1 | 5/2003 | Mizuno |
| 2003/0132075 A1 | 7/2003 | Drivers |

* cited by examiner

POWER ASSISTED STEERING FOR ALL TERRAIN VEHICLE

RELATED APPLICATIONS

This application is related to and claims the priority benefit of U.S. Provisional Patent Application No. 60/299,946, filed on Jun. 21, 2001, which is hereby incorporated by reference in its entirety.

BACKGROUND OF THE INVENTION

1. Field of the Invention

The present invention generally relates to all terrain vehicles. More particularly, present invention relates to recreational all terrain vehicles having power assisted steering arrangements useful to facilitate low speed steering and steering with a locked differential as well as to reduce high-speed steering kick-back caused by glancing blows to steerable wheels.

2. Description of the Related Art

All terrain vehicles currently are undergoing a transformation. Previously, the vehicles were rather simple in design, relatively low powered and featured few rider comforts associated with larger motor vehicles, such as automobiles. Recently, however, riders have been demanding more of their recreational vehicles and manufacturers have been accommodating the rider demands.

One recent modification to all terrain vehicles has been the increase of horsepower and the associated increase in speed. In the past few years, the displacement size of engines used in all terrain vehicles has increased dramatically. The increase in displacement has been made possible, at least in part, by advances in engine design and technology. These advances enable the output of the engine to be much higher, sometimes at the cost of increased vehicle weight. Other changes in vehicle design also have resulted in increased vehicle weight.

The increase in vehicle weight has several drawbacks that generally have been considered design tradeoffs for the advantages. One of these drawbacks is the high forces required to turn the steering wheels while the vehicle is stationary or moving very slowly. The steering system in many recreational all terrain vehicles generally comprises a steering handle assembly that is connected to a steering shaft. The lower end of the steering shaft carries a pitman arm and the pitman arm is connected to the steering wheels by connecting rods. While this simple system is easy to manufacture and maintain, the system becomes increasingly difficult to turn at low speeds as the vehicle weight increases.

In addition, when an all terrain vehicle features a four wheel drive transmission having a lockable differential, steering effort must be increased when the differential is locked. As is known, a differential generally allows a pair of driven wheels to be uncoupled such that one wheel can be driven at a faster speed than the other wheel. For instance, during cornering, one wheel will rotate faster than another wheel when the wheels are connected by a differential. If the differential is locked, however, both wheels attempt to turn at the same speed. Thus, the effort needed to steer the vehicle is increased because both steerable wheels are attempting to rotate at the same speed.

A further issue involving the steering systems of recreational all terrain vehicles is steering kickback. Due to the terrain over which recreational all terrain vehicles are often operated, the vehicles often have to negotiate rocks, logs and other relatively immovable barriers or obstacles. When one of the steerable wheels comes into contact with an obstacle, the wheel often is forced rearward at a rapid rate. The rearward movement of the wheel then is transmitted directly through the steering arrangement to the operator. The glancing blow to the wheel, thus, can cause kickback in the steering assembly and can cause a temporary change in vehicle direction. Thus, the kickback can increase the steering effort required from the operator.

SUMMARY OF THE INVENTION

A need therefore exists for a recreational all terrain vehicle that is outfitted with an appropriate power assisted steering arrangement. In one arrangement, the power assisted steering accounts for the lock-state of a lockable differential. Preferably, the power assisted steering arrangement facilitates slow speed or stationary turning while also correcting for kickback at higher speeds. More preferably, the power assisted steering arrangement accounts for vehicle speed to reduce the amount of assist at higher speeds. As will be appreciated, providing a constant level of power assist for turning at low speeds as at high speeds would likely create a very edgy or twitchy riding experience.

Thus, one arrangement of the present invention provides a power assisted steering arrangement that reduces steering effort at lower speeds while limiting steering kickback at higher speeds. Preferably, the power assist is provided by an electrohydraulic assist system. In one particularly advantageous arrangement, the assist system features a variable speed, fixed displacement hydraulic pump.

Another arrangement of the present invention involves the provision of a damper-emulating valving arrangement within the steering assist system. The damper-emulating valving allows the steering assist system to damp some of the vibrations and shocks encountered during movement.

In some configurations, the present invention can feature speed sensitive steering assist such that more assist is provided at lower speeds and less assist is provided at higher speeds. The present invention also can further compensate if a lockable transmission associated with steerable wheels is in a locked condition.

One aspect of the present invention involves an all terrain vehicle comprising a steerable wheel and a frame supported by the steerable wheel. A handle bar assembly is pivotally attached to the frame and a flow control valve is connected to the handle bar assembly. A pitman arm is connected to the flow control valve and a linkage extends between the pitman arm and the steerable wheel. A hydraulic cylinder extends between the frame and at least one of the flow control valve, the pitman arm and the linkage. A fluid tank is connected to the flow control valve with a pressure line and a pump is interposed along the pressure line between the flow control valve and the tank. The valve also is connected to the tank with a return line. The pump is adapted to generate variable flow rates to the flow control valve.

Another aspect of the present invention involves an all terrain vehicle comprising a steerable wheel and a frame supported by the steerable wheel. A handle bar assembly is pivotally attached to the frame and a flow control valve is connected to the handle bar assembly. A pitman arm is connected to the flow control valve and a linkage extends between the pitman arm and the steerable wheel. A hydraulic cylinder extends between the frame and at least one of the flow control valve, the pitman arm and the linkage. A fluid tank is connected to the flow control valve with a pressure line and a pump is interposed along the pressure line between the flow control valve and the tank. The valve also is connected to the tank with a return line. A damping valve arrangement is positioned between the pressure line and the return line such that sudden shocks to the flow control valve can be substantially absorbed.

A further aspect of the present invention involves a method of controlling a power steering system for a recreational vehicle. The method comprises sensing a first vehicle speed, operating a pump to provide a first flow rate of fluid within a closed loop hydraulic path, sensing a second vehicle speed, comparing the first vehicle speed to the second vehicle speed, operating the pump to provide a second flow rate of fluid wherein the first flow rate is higher than the second flow rate if the first vehicle speed is lower than the second vehicle speed and the first flow rate is lower than the second flow rate if the first vehicle speed is higher than the second vehicle speed.

An additional aspect of the present invention involves a method of controlling a power steering system for a recreational vehicle. The method comprises sensing a vehicle speed, operating a pump to provide a first flow rate of fluid within a closed loop hydraulic path, comparing the vehicle speed to a preset vehicle speed, operating the pump to provide a second flow rate of fluid if the vehicle speed exceeds the preset vehicle speed wherein the second flow rate is lower than the first flow rate.

Another aspect of the present invention involves a method of controlling a power steering system for a recreational vehicle. The method comprises sensing a vehicle speed, comparing the sensed vehicle speed to a preset vehicle speed, decreasing a flow rate of fluid within the power steering system if the sensed vehicle speed exceeds a preset vehicle speed.

A further aspect of the present invention involves a method of controlling a power steering system for a recreational vehicle. The method generally comprises sensing a first vehicle speed, providing a fluid flow at a flow rate within the power steering system, sensing a second vehicle speed, increasing the flow rate of fluid flow within the power steering system if the first vehicle speed is greater than the second vehicle speed and decreasing the flow rate of fluid flow within the power steering system if the second vehicle speed is greater than the first vehicle speed. In one arrangement of this aspect, the second vehicle speed is sampled a preset period of time after the first vehicle speed is sampled. In another arrangement of this aspect, the first vehicle speed and the second vehicle speed are preset vehicle speed limits.

Another aspect of the present invention involves an all terrain vehicle comprising a frame assembly with a pair of dirigible front wheels connected to the frame assembly. An engine is disposed within a central portion of the frame assembly and a seat is supported by the frame assembly and positioned generally above the engine. The engine selectively powers the front wheels through a front wheel drive assembly. The front wheel drive assembly comprises a lockable differential. A handle bar assembly is positioned forward of the seat. The handle bar assembly comprises a pair of transversely spaced grips connected to a steering column. The steering column has a limited rotational range of less than about 270 degrees. A power steering cylinder comprises a cylinder body that is connected to the frame assembly. The cylinder body defines a pair of cylinder chambers separated by a piston. A piston rod extends from the cylinder body, is connected to the piston at one end and is operably connected to the steering column at another end. The steering column is fixed for rotation with an input shaft of a power steering valve. The power steering valve forms a portion of a closed loop power steering fluid system. The power steering valve comprises a spool and an output shaft. The input shaft and the output shaft are connected with a torsion bar. The output shaft is adapted for connection to the front wheels. The spool is connected to the output shaft such that rotation of the output shaft relative to the input shaft results in the power steering valve opening and flow in the closed loop being directed into or out of the cylinder chambers to effect movement of the piston rod. The closed loop power steering system further comprises a bypass passage that diverts flow from around the spool valve. A flow regulator is disposed within the bypass passage. A controller is adapted to control the flow regulator depending upon a sensed vehicle operating speed and a sensed differential lock mode.

A further aspect of the present invention involves an all terrain vehicle comprising a steerable wheel and a frame supported by the steerable wheel. An engine is supported by the frame. A seat is disposed generally above the engine and a handle bar assembly is pivotally attached to the frame. A flow control valve is connected to the handle bar assembly. A pitman arm is connected to the flow control valve and a linkage extends between the pitman arm and the steerable wheel. A hydraulic cylinder extends between the frame and at least one of the flow control valve, the pitman arm and the linkage. A fluid tank is connected to the flow control valve with a pressure line. A pump is interposed along the pressure line between the flow control valve and the tank. The valve also is connected to the tank with a return line and the flow control valve is connected to the hydraulic cylinder.

An additional aspect of the present invention involves a method of controlling a power steering system for a recreational vehicle. The method comprises sensing a first vehicle speed, controlling flow characteristics in the power steering system to provide a first flow rate of fluid within a closed loop hydraulic path, sensing a second vehicle speed, comparing the first vehicle speed to the second vehicle speed, controlling flow characteristics in the power steering system to provide a second flow rate of fluid wherein the first flow rate is higher than the second flow rate if the first vehicle speed is lower than the second vehicle speed and the first flow rate is lower than the second flow rate if the first vehicle speed is higher than the second vehicle speed.

A further aspect of the present invention involves a power steering system for use on an all terrain vehicle. The power steering system comprises a power steering cylinder comprising a cylinder body defining a pair of cylinder chambers separated by a piston. A piston rod extends from the cylinder body and is connected to the piston at one end and is operably connected to a steering column at another end. An input shaft of a power steering valve is adapted for connection to the power steering column. The power steering valve forms a portion of a closed loop power steering fluid system. The power steering valve further comprises a spool and an output shaft. The input shaft and the output shaft are connected with a torsion bar. The output shaft is adapted for connection to a steerable wheel. The spool is connected to the output shaft such that rotation of the output shaft relative to the input shaft results in the power steering valve opening and flow in the closed loop being directed into or out of the cylinder chambers to effect movement of the piston rod. The closed loop power steering system further comprises a bypass passage that diverts flow from around the spool valve. A flow regulator is disposed within the bypass passage and a controller is adapted to control the flow regulator depending upon a sensed vehicle operating speed and a sensed differential lock mode.

BRIEF DESCRIPTION OF THE DRAWINGS

These features, aspects and advantages will be described in further detail with reference to drawings of a preferred arrangement of the present invention. The drawings contain eight figures.

DETAILED DESCRIPTION OF THE PREFERRED EMBODIMENTS

Figure 1:
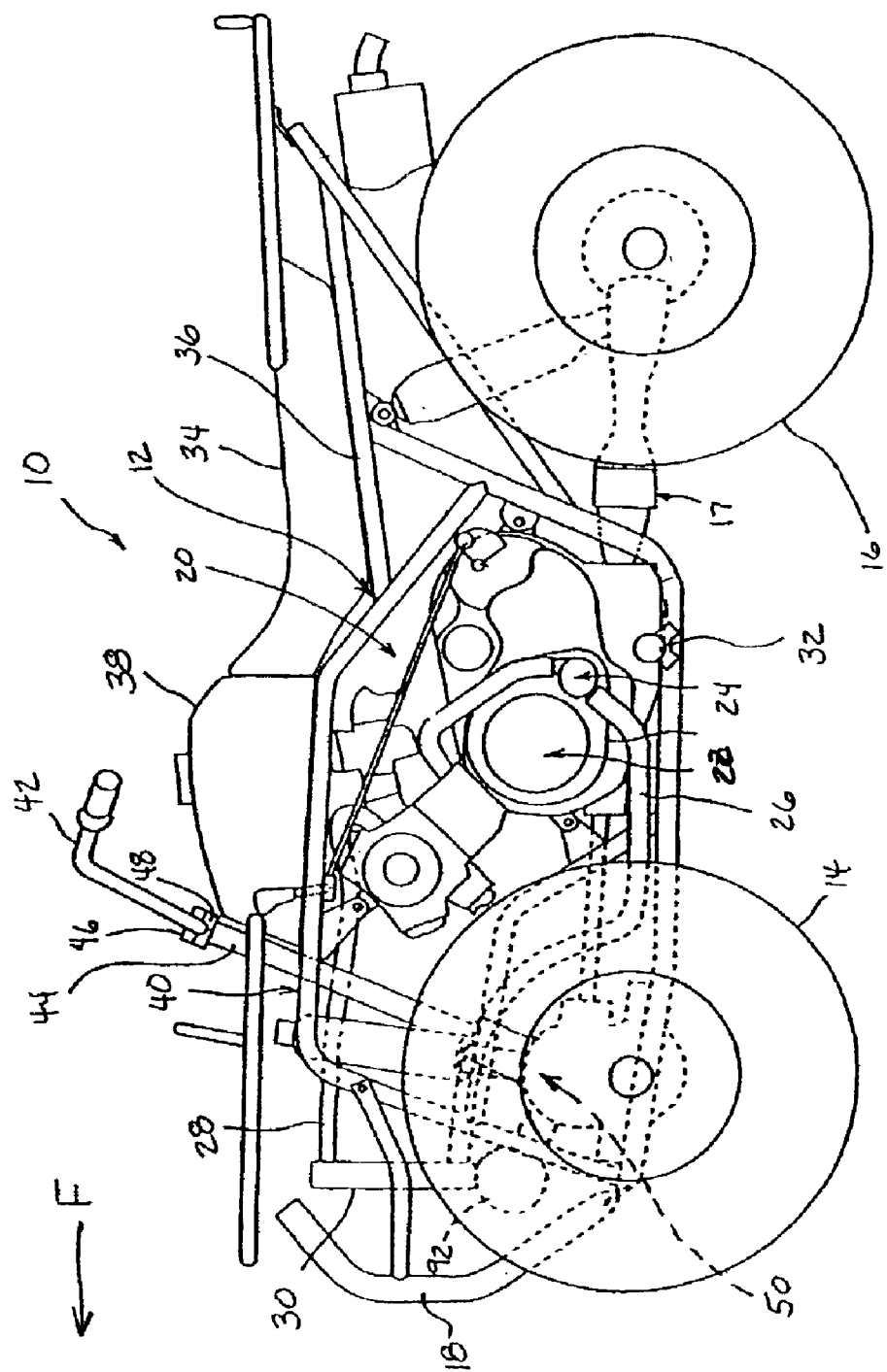
FIG. 1 is a side elevation view of a recreational all terrain vehicle featuring a power assisted steering arrangement having certain features, aspects and advantages of the present invention.

With reference initially to FIG. 1, a recreational all terrain vehicle, which is generally indicated by the reference numeral 10, has been designed and configured to employ a power assisted steering arrangement that can be arranged and configured in accordance with certain features, aspects and advantages of the present invention. While the present power assisted steering arrangement will be described in the context of a four wheeled recreational all terrain vehicle, it is anticipated that certain features, aspects and advantages of the present power assisted steering arrangement also can be used with other light duty vehicles. Certain features, aspects and advantages of the present invention also can be used in vehicles featuring two or more sets of steerable wheels.

With continued reference to FIG. 1, the illustrated vehicle 10 generally comprises a frame assembly 12 that is supported by two sets of wheels. In the illustrated arrangement, a pair of front wheels 14 are connected to the frame assembly 12 in any suitable manner. The front wheels 14 preferably are connected to a steering assembly, which will be discussed in further detail below and which imparts steering movement of the wheels 14 relative to the frame assembly 12.

A pair of rear wheels 16 also are connected to the frame assembly 12 in any suitable manner. In the illustrated arrangement, the rear wheels 16 are connected to the frame assembly 12 with a pivotally connected swing arm configuration 17. All of the wheels 14, 16 preferably are suspended in a suitable manner to cushion and damp relative movement between the frame assembly 12 and the wheels 14, 16. While the illustrated arrangement features all wheel drive capabilities, it is anticipated that a power assisted steering configuration having certain features, aspects and advantages of the present invention can also be used with two wheel drive vehicles, whether front wheel drive or rear wheel drive.

The illustrated frame assembly 12 generally comprises a number of frame components that are welded together. Preferably, the frame assembly comprises a left side assembly and a right side assembly, each of which is formed in a generally parallelogram-type configuration. These two side assemblies then can be connected using a number of cross members. Because this type of frame assembly is well known, further description of the frame assembly is unnecessary.

A forward portion of the illustrated frame assembly 12 comprises a front bumper 18 that extends upwardly and forwardly of a lower portion of the frame assembly 12. The front bumper 18 preferably wraps over a forward portion of the vehicle 10 and is disposed forward of the upwardly extending uprights of the frame assembly 12. The front bumper 18 can be formed integrally with the frame assembly 12 or can be a separate add-on component. In some arguments, the frame assembly 12 can have a center beam construction such that a centrally positioned longitudinally-extending tube forms a majority of the frame assembly 12.

The frame assembly 12 provides a platform upon which a variety of other components can be mounted. For instance, the generally hollow center of the frame assembly 12 defines an engine compartment 20. The engine compartment 20 generally is defined between the left portion and the right portion of the frame assembly 12 and generally is disposed between the front wheels 14 and the rear wheels 16. This location provides a lowered and centralized location for an engine 22, which lowers the center of gravity of the vehicle.

The engine 22 preferably is mounted in any suitable manner within the engine compartment 20. In some configurations, engine mounts are provided on the uprights of the frame assembly and the engine is secured to the engine mounts. The engine 22 can be of any suitable construction.

Preferably, the engine is provided with an auxiliary drive arrangement that can be used to power a hydraulic pump for the power assisted steering arrangement. Such a construction is not illustrated, but the hydraulic pump used in the power assisted steering arrangement can be driven by a crankshaft of the engine in a manner similar to that used for a flywheel magneto or other electrical generator. It is also anticipated that the hydraulic pump could receive power directly or indirectly from a balancer shaft, which is used to oppose movement by the crankshaft such that engine vibration can be reduced. Furthermore, in some configurations, the hydraulic pump can be electrically driven. Any suitable technique for mounting and connecting the hydraulic pump to a motive member (e.g., crankshaft, balancer shaft, etc.) can be used.

In one application, the pump is housed within a housing designed to replace a recoil start mechanism for the engine such that the pump can be driven off of the crankshaft of the engine. In a particularly advantageous arrangement, the pump can be housed within a housing that allows a recoil mechanism to bolt onto the outside of the pump such that the recoil starter function is maintained. In a further arrangement, the pump and the recoil starter can be integrated into a single component that incorporates both the pump mechanism and the recoil starter mechanism. Such an integrated arrangement helps reduce the overall size of the engine.

In the illustrated arrangement, a cooling pump 24 is powered indirectly by the crankshaft though a gear train terminating at a balancer shaft. The cooling pump 24 circulates coolant through portions of the illustrated engine 22. The cooling pump 24 also circulates the coolant though a heat exchanger 30 (i.e., radiator). In particular, the cooling pump 24 supplies the coolant to the heat exchanger 30 through a first line 26 and the coolant is returned to the engine through a second line 28. Other constructions and flow patterns also can be used.

With continued reference to FIG. 1, a pair of foot pegs 32 preferably extend laterally outward from the frame assembly 12. The foot pegs 32 provide a location for the operator of the vehicle 10 to position his or her feet during movement of the vehicle 10. Footboards, nerf bars and other suitable constructions also can be used.

A seat 34 preferably is disposed generally above the engine 22 and forward of the rear wheels 16. The illustrated seat 34 is configured to allow an operator to sit in straddle fashion with one leg positioned on either side of the engine 22 and resting on the respective foot pegs 32. The illustrated seat is mounted to a set of seat rails 36, which form a portion of the frame assembly 12. While the seat 34 can be mounted to the seat rails 36 in any suitable manner, the seat preferably is mounted such that it can be removed for access to the engine 22 and related components. For instance, the seat 34 can comprise a portion that is pivotally attached to the seat rails 36 such that the seat can be unlatched and raised to access the engine compartment 20.

With continued reference to FIG. 1, a fuel tank 38 preferably is disposed generally forward of the illustrated seat 34. In some arrangements, the fuel tank 38 can extend rearward under a portion of the seat 34 such that the weight of the fuel can be positioned lower in the vehicle 10. The fuel tank 38 can be mounted in any suitable manner and can be made from any suitable material.

Forward of at least a portion of the fuel tank 38, the frame assembly 12 carries a steering assembly 40. The steering assembly 40 generally comprises handle bars 42 that are positioned for easy grasping by an operator of the vehicle. The handle bars 42 can be secured to an upper flange of a steering column 44 using a set of upper and lower holders 46, 48.

Preferably, an upper portion of the steering column 44 is secured to a cross member of the frame assembly 12. In some arrangements, oil seals are mounted over the steering column and the oil seals are positioned adjacent outer ends of a split plane bearing assembly (not shown). The split plane bearing assembly comprises two halves that are secured together using pins and threaded fasteners. The plane bearing is secured to a lower steering bracket in any suitable manner. A mid portion of the steering column 44 also can be secured to a cross member of the frame assembly 12 using bearings to reduce binding.

Figure 2:
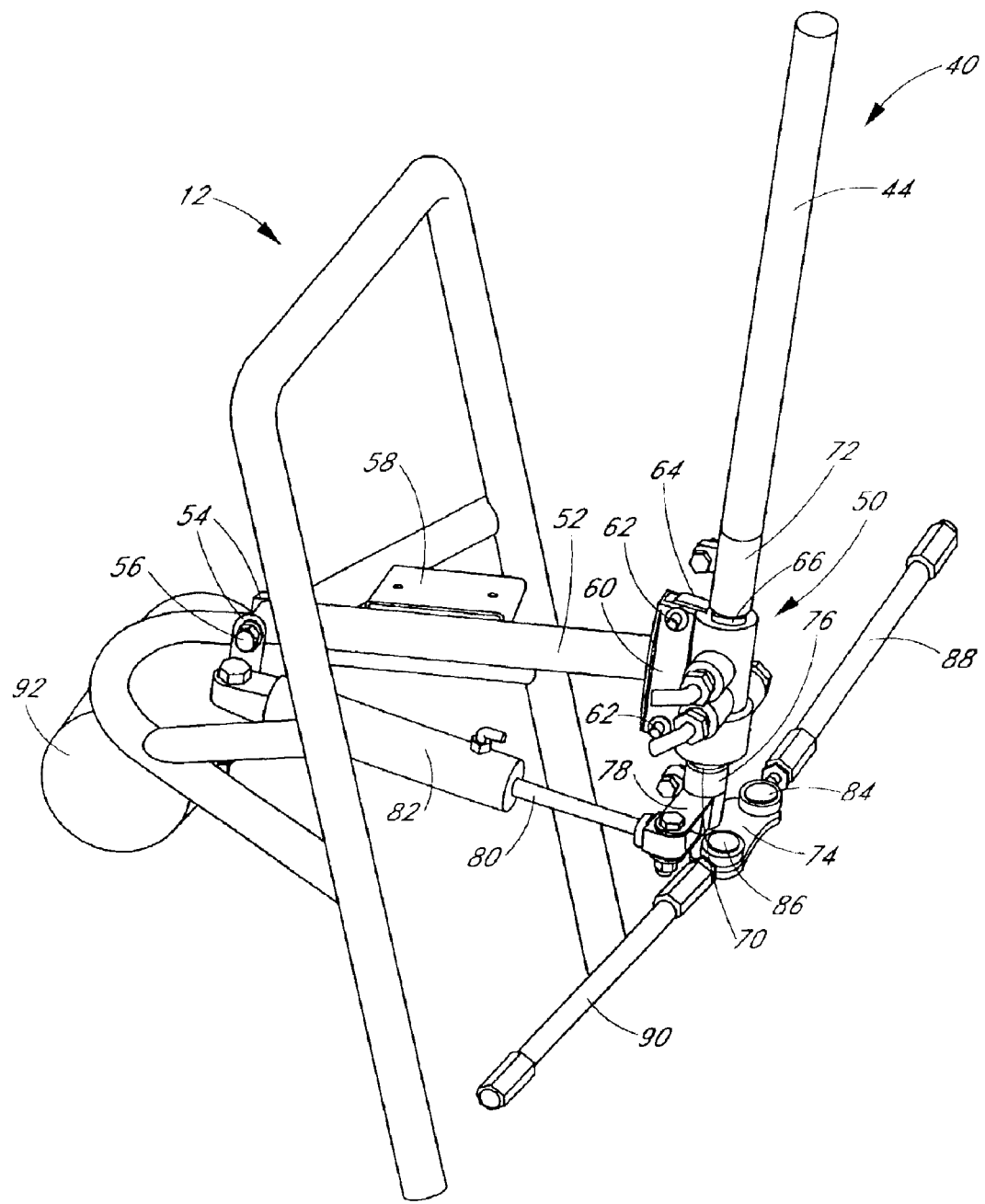
FIG. 2 is a top-rear perspective view of a power assisted steering arrangement having certain features, aspects and advantages in accordance with the present invention and being adapted for use in light weight vehicular applications, such as the vehicle of FIG. 1.
Figure 3:
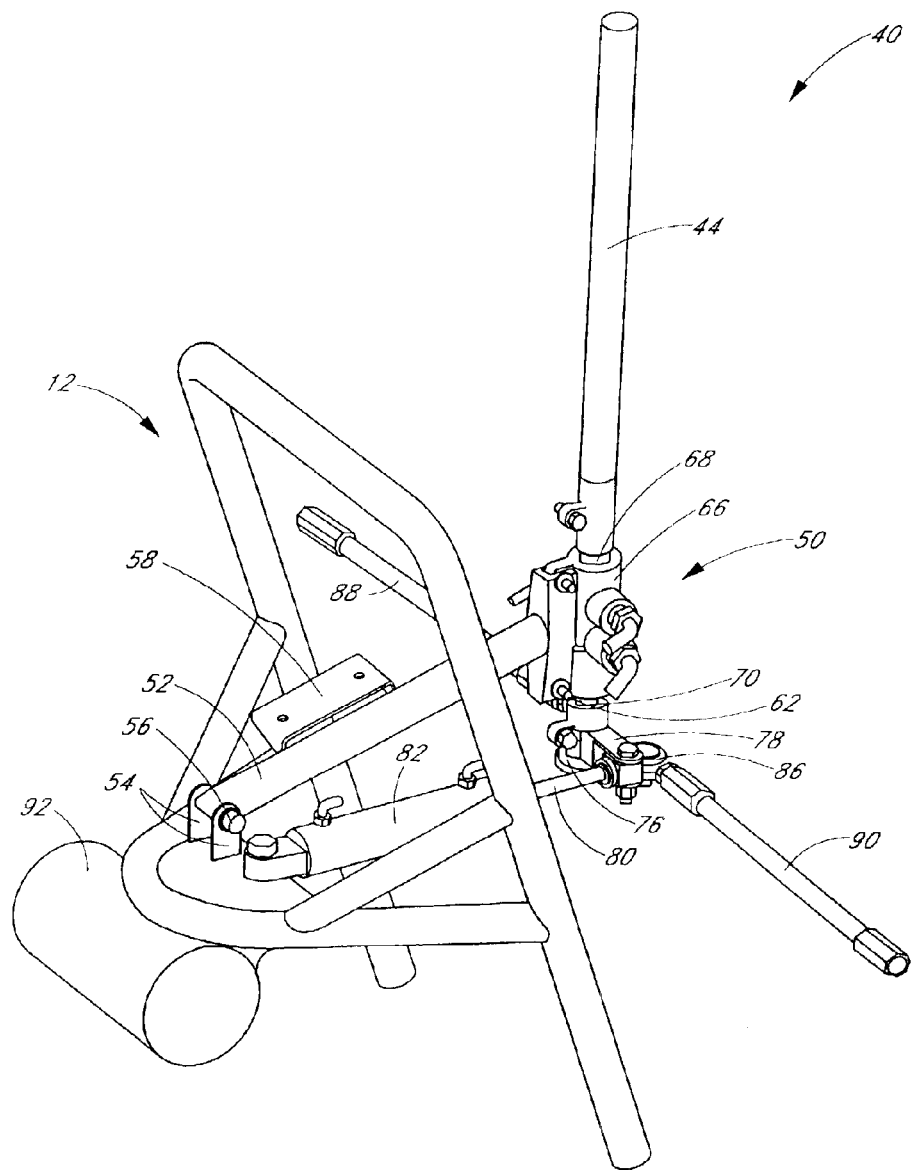
FIG. 3 is a top-rear perspective view of the power assisted steering arrangement of FIG. 2.
Figure 4:
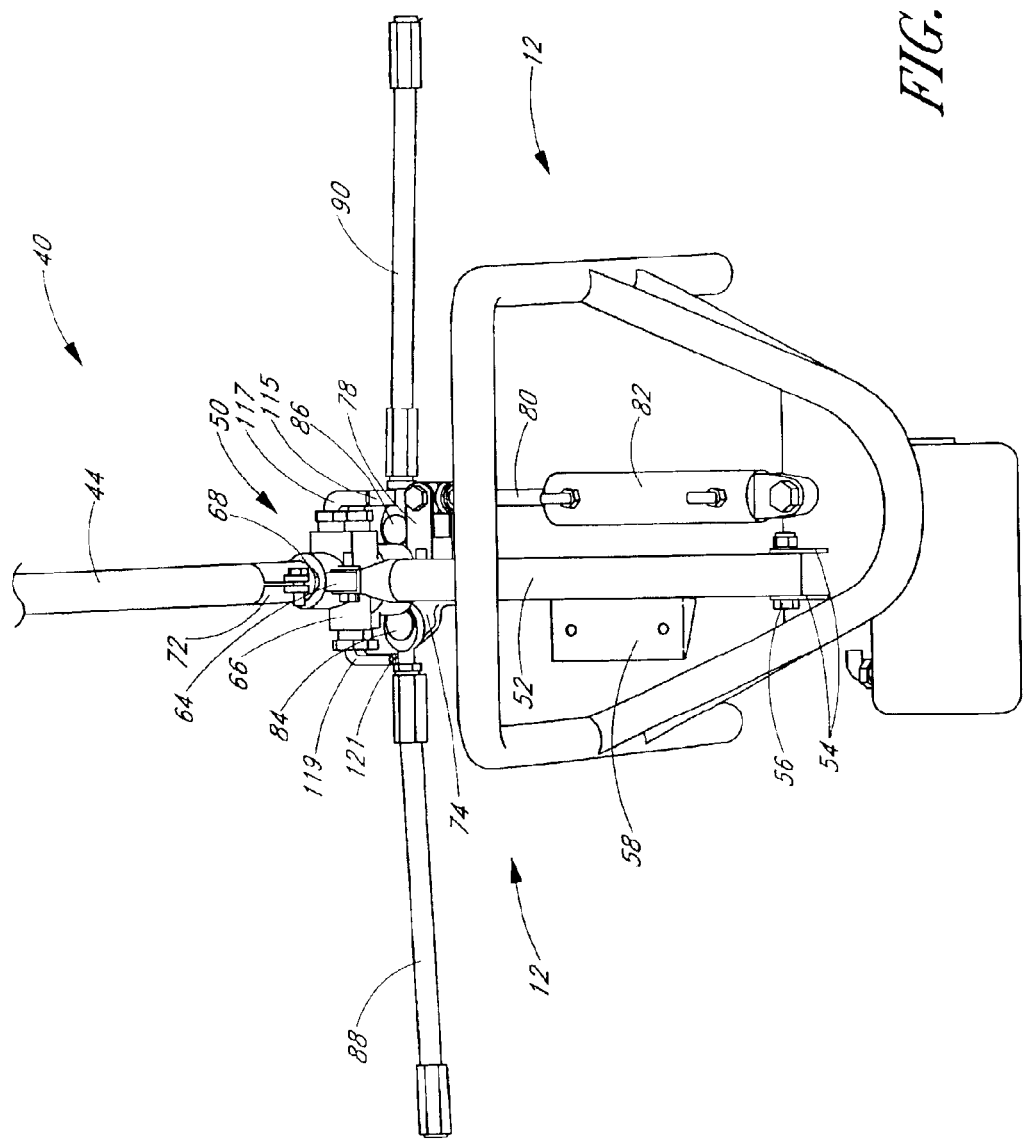
FIG. 4 is a top-front perspective view of the power assisted steering arrangement of FIG. 2.

With reference now to FIGS. 2–4, a presently preferred mechanical linkage between the steering column 44 and the front wheels 14 (or the associated hubs) will be described in more detail. As illustrated, the steering column 44 extends downward toward a rotational servo valve arrangement 50. The servo valve arrangement 50 preferably is supported by the frame assembly 12. In the illustrated arrangement, the servo valve arrangement 50, which will be described in more detail below, is secured to a cantilevered post 52. As best shown in FIG. 3, a pair of upstanding flanges 54, which are mounted to a plate attached to the frame assembly 12, straddle a forward end of the post 52. A threaded fastener 56 secures the post 52 between the flanges 54. Preferably, the threaded fastener 56 is tightened to secure the post 52 in position. In some advantageous configurations, the post 52 actually forms a portion of the welded up frame assembly 12. In other advantageous configurations, the post 52 can be replaced by a mounting flange or the like, which can extend from any of the down tubes, cross tubes or other frame components.

A mounting plate 58 extends to the side of the illustrated post 52. The mounting plate 58 can be used to mount any of a variety of hardware components. For instance, in some configurations using an electric pump for the power assisted steering arrangement, the pump can be mounted to the mounting plate 58. In test vehicles, the mounting plate 58 can be used to secure complicated sensors and other circuitry that can be used for tuning and evaluating various equipment associated with the vehicle. For instance, while developing the present power assisted steering arrangement, pressure sensors, flow meters and the like were mounted to the mounting plate 58.

The servo valve arrangement 50 preferably attaches to a mounting fixture 60 that is secured to the post 52 in any suitable manner. The mounting fixture 60 can include a number of threaded fasteners 62 and can be attached to a flange 64, which is formed on a housing 66 of the servo valve arrangement 50. In one arrangement, the mounting fixture 60 comprises a stub shaft (not shown) which is received and secured within an end of the post 52. Other suitable mounting arrangements for the servo valve arrangement 50 also can be used.

With continued reference to FIGS. 2–4, the servo valve arrangement 50 comprises an input shaft 68 and an output shaft 70. The input shaft 68 preferably is secured to the lower end of the steering column 44. The input shaft 68 can be integrated with the steering column 44, if desired. In some arrangements, the two components are splined together to reduce or eliminate relative rotational movement between the two components. In the illustrated arrangement a coupling sleeve 72 is used to connect the two components. Preferably, the coupling sleeve 72 provides internal splines that cooperate with external splines formed on the respective ends of the steering column 44 and the input shaft 68. Any other joining technique also can be used.

With reference to FIG. 2, a coupling sleeve 76 is used to join the lower end of the output shaft 70 to a stub shaft, which is secured to the pitman arm 74. In some arrangements, the output sleeve can be directly connected to the pitman arm 74. The illustrated coupling sleeve 76 also comprises a mounting flange 78. The mounting flange 78 extends out to one side of the coupling sleeve 76 in the illustrated arrangement. It is anticipated that the flange 78 or any other suitable mounting fixture can extend outward in any desired direction. The mounting flange 78 preferably is sized and oriented to receive the outer end of a ram 80 of a cylinder 82 used in the illustrated power assisted steering arrangement.

The cylinder 82, in turn, is mounted to the frame assembly 12 in any suitable manner. In the illustrated arrangement, the cylinder 82 is mounted to the same plate that includes the upstanding flanges 54. By mounting the cylinder 82 to the frame assembly 12 and the ram 80 to the steering column 44, the heavier component is advantageously supported by the frame assembly 12 rather than the steering assembly 40. The components can be reversed, if desired. It should also be noted that the cylinder 82 and the ram 80 preferably are capable of pivotal movement while mounted. In the illustrated arrangement, the ram 80 extends generally longitudinally within the forward portion of the vehicle. Such a configuration make advantageous use of available space in the vehicle. In addition, by placing the cylinder 82 in a central position, component balancing is simplified. In some arrangements, the cylinder 82 could extend inward from an outer side of the vehicle and could be inclined or declined as desired or as necessitated by the particular vehicle.

The pitman arm 74 (see FIG. 2) supports a first universal joint 84 and a second universal joint 86. The first universal joint 84 connects a first tie rod 88 to the pitman arm 74 while the second universal joint 86 connects a second tie rod 90 to the pitman arm 74. The first tie rod 88 and the second tie rod 90 extend laterally outward to a third universal joint (not shown) and a fourth universal joint (not shown), respectively in a well-known manner. The third and fourth universal joints connect the tie rods 88, 90 to carrier hubs (not shown) respectively. Thus, movement of the universal joints 84, 86, which is caused by movement of the pitman arm 74, results in steering movement of the wheels that are carried by the carrier hubs. Details regarding the connections between the tie rods 88, 90 and the steerable wheels 14 have been omitted because such connections are well-known and any suitable connection can be used.

With continued reference to FIGS. 2–4, a reservoir 92 preferably is mounted to the frame assembly 12 in any suitable manner. While the illustrated reservoir 92 is disposed forward of the steering assembly 40, other configurations also can be used. Preferably, however, the reservoir 92 is positioned within a flow of air during movement of the vehicle. More preferably, the reservoir 92 is mounted in a protected or semi-protected location. For instance, the reservoir 92 can be positioned rearward of the front bumper 18, generally below the radiator 30. In some advantageous configurations, an accumulator can assume the responsibilities of the reservoir 92. It is also anticipated that, in some applications, frame rails or tubing can form holding tank for the fluid (i.e., hollow tubing is filled with fluid) to reduce the space occupied by the reservoir 92.

Figure 5:
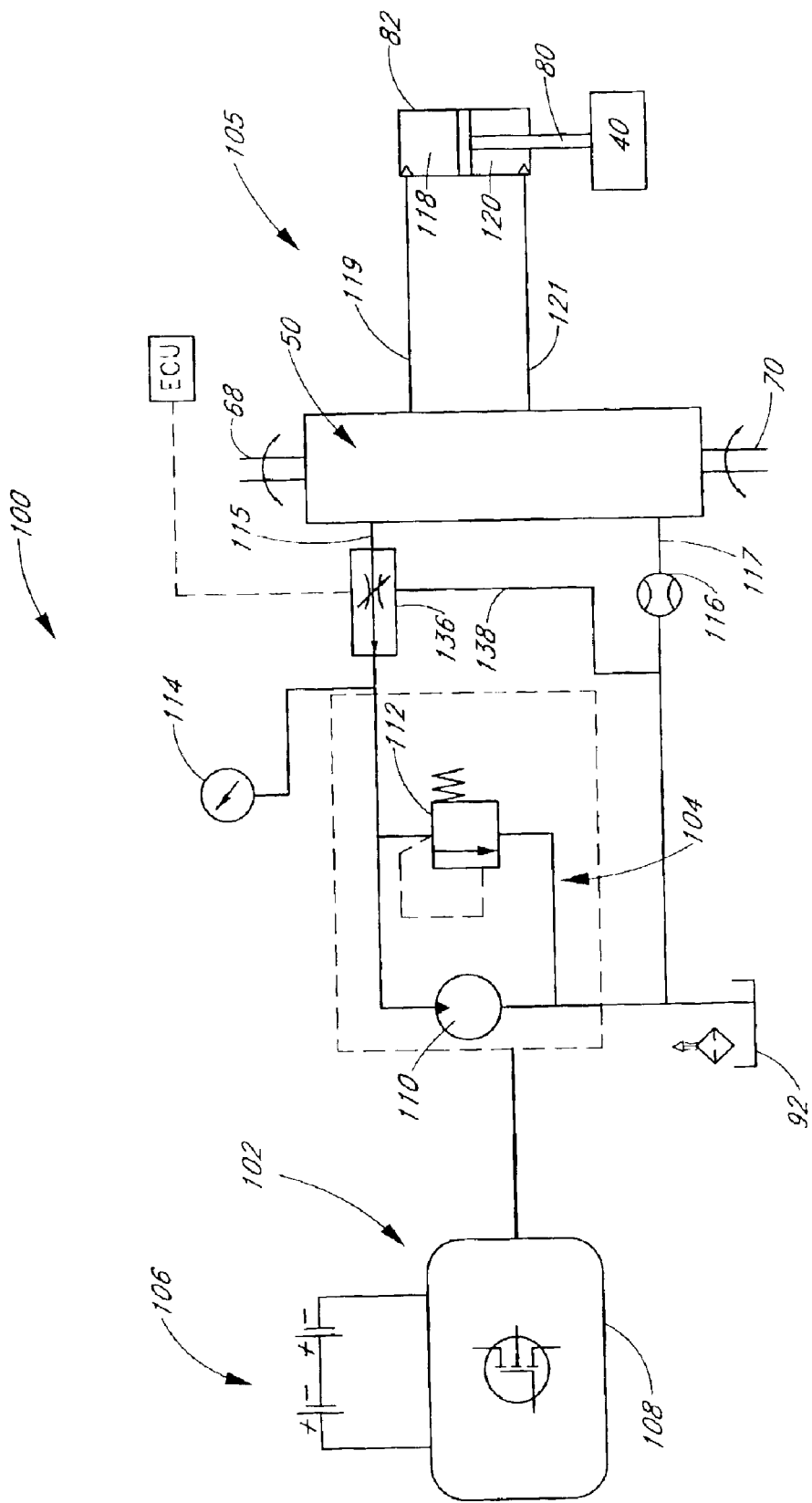
FIG. 5 is a schematic illustration of a power assisted steering arrangement of FIG. 2 having certain features, aspects and advantages in accordance with the present invention.

With reference now to FIG. 5, the steering arrangement 40, which employs a power assist arrangement 100 that is configured in accordance with certain features, aspects and advantages of the present invention, is schematically illustrated. The illustrated arrangement 40 generally comprises an electrical portion 102, the reservoir 92, a pumping portion 104, and a steering actuator portion 105 (e.g., the servo valve 50 and the cylinder/ram 80, 82).

The electrical portion 102 in the illustrated arrangement supplies an energy input to the pumping portion 104. Thus, the illustrated electrical portion 102 comprises a battery array 106 and a pulse width modulator chopper circuit 108. The present battery array 106 preferably supplies 24 volts of direct current to the circuit 108; however, the voltage required can vary from application to application depending upon the pump requirements. The power from the circuit 108 is supplied to an electric positive displacement pump 110, which is a component of the pumping portion 104. In one application, as little as 150 W to 200 W of power is required to operate the power assist system. Other types of pumps can be used, if desired.

The pumping portion 104 generally comprises the pump 110 and an adjustable pressure relief valve 112. The pressure relief valve 112 limits that maximum level of pressure that can be generated within the system 100. Thus, the pressure may be advantageously limited to a level that will not endanger the operability of the components. The pump 110, which is receiving electrical power from the electrical portion 102 in the illustrated arrangement, draws fluid from the reservoir 92 and supplies the fluid at a substantially constant flow rate to the servo valve assembly 50. Preferably, the pump 110 provides a flow of about 1 gpm. In some arrangements, the system preferably will operate with a pressure of between about 200 psi and about 600 psi. In such arrangements, the flow rate preferably will be between about 0.25 gpm and about 1.5 gpm. In other arrangements, the system will operate with a pressure of between about 300 psi and about 500 psi. In such arrangements, the flow rate preferably will be between about 0.5 gpm and about 1.2 gpm. In one advantageous arrangement, the pressure is about 330 psi and the flow rate is between about 0.75 gpm and 1.0 gpm.

In some advantageous arrangements, the pump 110 is a gerotor oil pump. The gerotor pump can be packaged in a purpose built housing that includes both a hydraulic flow control valve and an electrically actuated flow control valve. The hydraulic flow control valve can be used to maintain a near constant flow rate over a wide range of engine speeds. The electrically actuated flow control valve can be used to increase or decrease the flow rate within the system.

Altering the flow rate can be used to decrease the available steering assist at higher vehicle speeds. Preferably, the flow rate is controllably and continuously variable. In some preferred arrangements, the flow rate is generally inversely controlled relative to vehicle speed, as will be discussed below. In other preferred arrangements, the flow rate can be mapped to vehicle speed over three or more different vehicle speed ranges. For instance, a first map of flow rates versus vehicle speed can be used for slower speed operation, a second map for middle speed operation and a third map for high speed operation. Each map can comprise curves reflecting desired flow rates to achieve a desired level of steering sensitivity at each vehicle speed.

The pump 110 provides fluid to the servo valve assembly 50. The servo valve assembly 50, in turn, selectively supplies fluid at continuously variable flow rates and in both directions to a pair of chambers 118, 120 of the cylinder 82 to produce bidirectional movement of the ram 80. Fluid expelled from the chambers 118, 120 of the cylinder 82, along with fluid simply passing through the servo valve assembly 50 without being passed into the cylinder 82, is returned to the reservoir 92 such that a closed loop steering system is defined.

A minimum steering system pressure, which is a product of the pump output flowrate and the servo valve configuration, determines, at least in part, the feel of the steering system. Increasing the minimum pressure increases the responsiveness of the system from the neutral position.

In the illustrated arrangement, a pressure transducer 114 is provided. The pressure transducer 114 is configured to measure the pressure within the system 100. The illustrated arrangement also features a flow transducer 116 that is configured to measure the flow rate within the system 100. These transducers 114, 116 are included for experimental purposes and may be removed in production equipment.

Preferably, the servo valve assembly 50 is an open center rotary servo valve. One example of such a servo valve is provided with a steering system available from Unique Metal Products in Santee, Calif. The steering system features a Stage II Control Valve and is part number 84000. The servo valve assembly 50 preferably is modified in manners discussed below to reduce the available angular travel such that the perceived play at the handlebars can be reduced. In addition, the present power steering system is also unique relative to an automotive system employing the Stage II Control Valve because the present system accommodates a rather small range of total handlebar movement. As can be appreciated, handlebars have a lock-to-lock range of movement that is substantially less than a steering wheel arrangement in which the steering wheels rotates more than one single revolution. For instance, one arrangement of the present invention has a lock-to-lock sweep of between about 30 degrees and 180 degrees while an automotive application typically has a sweep of more than about 540 degrees.

Figure 6:
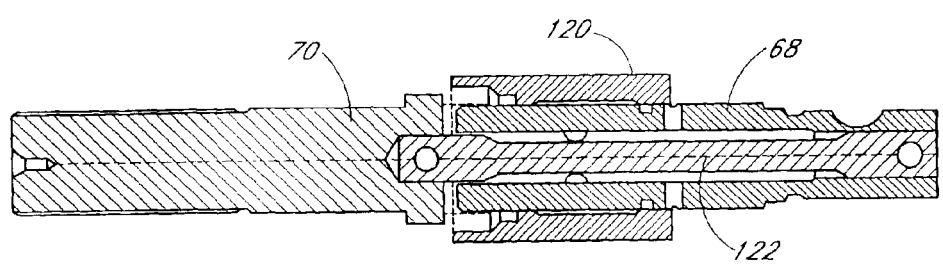
FIG. 6 is a sectioned view of a preferred servo valve assembly used in the power assisted steering arrangement of FIG. 5.

With reference now to FIG. 6, the presently preferred servo valve assembly 50 will be described in more detail. The servo valve assembly 50 generally comprises an outer housing (not shown) that contains four hose barbs or nipples 115, 117, 119, 121. These hose nipples allow connection to a pressure line 115 (from pump), a return line 117 (to tank), a left line 119 (to cylinder) and a right line 121 (to cylinder). The fluid is routed to the desired location through these lines by the servo valve in known manners.

A valve spool 120 is positioned within the outer housing. While not shown in the simplified drawing of FIG. 6, the spool 120 typically includes a number of through holes and outer grooves. One group of the grooves contain the through holes which pass from each groove to the open center of the spool 120 while the other group of grooves are configured to receive o-rings. In short, one groove of the first group forms a portion of a fluid passage defined between the spool and the housing while the two adjacent grooves of the second group host o-rings that seal the fluid passages from each other. The fluid passages from the nipples to the center of the spool 120 are "opened" and "closed" by cooperation of the input shaft 68 and the spool 120 in manners that will be discussed below.

The input shaft 68 extends through the spool 120 and is connected to the output shaft 70, which is positioned on the other end of the spool 120. The spool 120 is connected to the output shaft. Both the input shaft 68 and the output shaft 70 extend at least partway into the housing that contains the spool 120. A torsion bar 122 extends through the input shaft 68 (and therefore the spool 120) and at least a portion of the output shaft 70. Preferably, the torsion bar 122 is pinned to the input shaft 68 and the output shaft 70. The torsion bar 122 is sized to flex (i.e., twist) slightly when the input shaft 68 and the output shaft 70 rotate relative to each other. Preferably, the connection allows a greatly reduced degree of play between handlebar movement and wheel movement.

The servo valve assembly 50 is used to sense the application of torque to the steering shaft (i.e., from either end—by the driver or by the front wheels) and to proportionally direct hydraulic fluid to overcome or neutralize the forces opposing the driver. The torsion bar 122 connects the input shaft 68 and the output shaft 70. With one end restrained, relative rotational movement at the other end will cause the torsion bar 122 to take a twist of a few degrees to the right or the left. When released, the torsion bar 122 will spring back to a centered position.

The input shaft 68 and the output shaft 70 form a part of the servo valve assembly 50 and also are capable of directly transferring torque between each other in the event that the servo valve fails or does not operate as needed. In one preferred arrangement, the two shafts 68,70 are capable of about 8 degrees of relative movement before engaging each other directly. In a more preferred arrangement, the two shafts are capable of about 5 degrees of relative movement before engaging each other directly. In a most preferred arrangement, the two shafts are capable of about 4 degrees of relative movement (i.e., about 2 degrees in each direction) before engaging each other directly.

The servo valve 50 opens during relative rotation of the shafts in direct proportion to the degree of twist applied to the torsion bar 122. Thus, the more twist, the more the valve 50 opens and the higher the rate of fluid flow until a sufficient pressure builds up in the cylinder 82 to overcome the resistance to movement of the output shaft 70. If the twist in the torsion bar 122 is released (i.e., the steering wheels move as desired or the handlebars are released), then the fluid being pumped through the valve 50 is routed directly to the reservoir 92.

Changing to a stiffer torsion bar 122 reduces the degree of twist resulting from a given torque of the handlebars 42 and, consequently, reduces the degree of valve opening. This, in turn, reduces the rate of flow through the valve 50 into the cylinder chamber and, therefore, the rate at which pressure can build up in the respective cylinder chambers to overcome the steering resistance. The result is a weaker response to driver demand (i.e., a heavy feel). Similarly, using a more limber torsion bar will increase the response to driver demand (i.e., a light feel). One consideration involved in selecting the torsion bar, however, is that the same outcome results whether the input to the steering system is from the operator (i.e., movement of the handle bars) or from the ground (i.e., an obstacle contacting a single wheel).

In accordance with the above, the stiffened torsion bar 122 (i.e., the largest diameter that would fit within input shaft 68) was desired for the present steering arrangement 40. The stiffer torsion bar 122 typically included a ring groove that accommodated an o-ring to seal against an inner surface of the input shaft 68. This groove disadvantageously presented a stress riser and provided a weakened portion of the torsion bar 122 which was prone to breakage. To resolve this problem, a groove has been formed on an inner surface of the input shaft 68 to accommodate the o-ring and the groove on the torsion bar 122 has been removed such that the seal could be maintained but the stress riser in the torsion bar 122 could be removed.

While not shown in the illustrated arrangement, a damper-emulating valve configuration can be positioned within the steering assembly 40. The damper-emulating valve advantageously allows the steering assist components (i.e., the damper-emulating valve/servo/cylinder combination) to act as a passive damper at higher vehicle speeds while maintaining desired steering assistance at lower vehicle speeds. Preferably, the valve is integrated into the servo valve, the cylinder housing, the ram or in between the components. In one configuration, the valve is an accumulator mounted between a pair of check valves that are positioned between the pump 110 and the servo valve assembly 50 and between the tank 92 and the servo valve assembly 50, respectively.

In use, an operator would turn the handle bars 42 toward the desired direction of travel. The movement of the handle bars 42 would cause rotation of the steering shaft 44 in the desired direction. The rotation of the steering shaft 44 is conveyed to the input shaft 66 of the servo valve assembly 50. The input shaft 66 and the torsion bar 122 would rotate relative to the output shaft 70 and the spool 120. The relative movement between the input shaft 66 and the spool 120 would cause a slight misalignment in the passages formed between the outside of the input shaft 66 and the inside of the spool 120. As discussed above, fluid is continuously circulating within the steering system at a generally constant flow rate. The misalignment in the passages within the servo valve assembly 50 would create a differential flow to the passages connecting the two chambers of the cylinder 82. The ram 80 within the cylinder 82 would move due to the pressure differential caused by the flow rate differences. The movement of the ram 80 causes movement of the steering linkage in the desired direction. The movement returns the passages within the servo valve assembly to a neutral position. The initial movement and the response are almost instantaneous and the movement and response cycle is generally continuous and dynamic during use.

Figure 7:
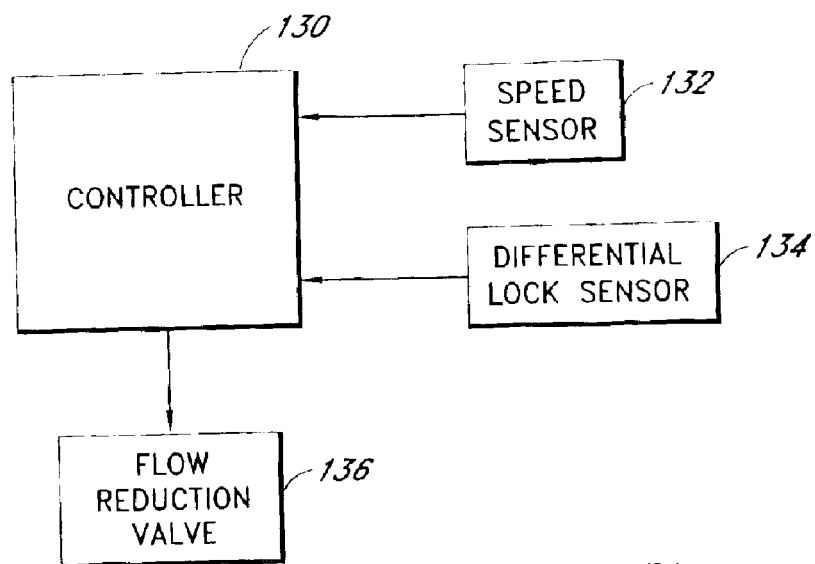
FIG. 7 is a block diagram on a control system used with the power assisted steering arrangement of FIG. 2.

As also discussed above, in one arrangement of the present power assisted steering system, the flow rate is varied depending upon vehicle speed and/or differential lock position. Such an arrangement is illustrated in FIGS. 5 and 7. With reference to FIG. 7, the vehicle 10 preferably comprises a controller 130. The controller 130 can be an ECU, a CPU, a dedicated processor, or the like.

The controller 130 is connected to a vehicle speed sensor 132. The vehicle speed sensor 132 can be any suitable speed sensor and can sense vehicle speed in any suitable manner. One preferred arrangement senses a shaft speed within the transmission. Other arrangements can be used to sense rotational speed of the engine, of the transmission or of the wheels.

A differential lock sensor 134 also communicates with the controller 130. The differential lock sensor 134 can simply check the operational positions of switches used to lock and unlock the differential. For instance, in one arrangement, two switches (not shown) are used to vary the transmission among two wheel drive, four wheel drive with an unlocked differential and four wheel drive with a locked differential. The positions of the switches can be used in place of a dedicated sensor 134. In other arrangements, the differential lock sensor 134 can be positioned proximate an actuator that is used to lock the differential and the sensor 134 can detect whether the differential has been locked or not.

The controller 130 receives input from the speed sensor 132 and from the differential sensor 134. Based upon the input, the controller can control a flow reduction valve 136 or other suitable flow regulator. The flow reduction valve 136 can provide continuously variable control of flow through the bypass passage. In some arrangements, the flow reduction valve 136 can provide distinct rates of flow. In one arrangement, the position of the flow reduction valve 136 is based upon signals modified by pulse width modulation that are used to adjust the positioning of the valve 136 and, thus, to control the degree to which the valve 136 is opened.

Figure 8:
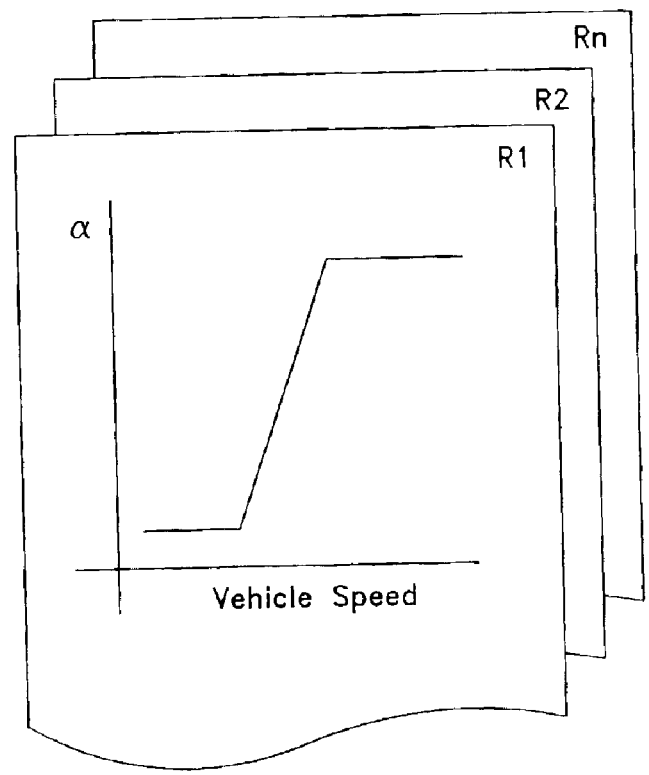
FIG. 8 is a schematic representation of various control maps used to control positioning of a flow reduction valve of the power assisted steering arrangement of FIG. 2.

With reference again to FIG. 5, the flow reduction valve 136 is positioned within a bypass 138 that reduces the available flow through the servo valve 50. By reducing the flow through the servo valve 50, the sensitivity of the power steering assembly can be reduced. As shown in FIG. 8, a plurality of control maps R1, R2, Rn preferably are provided. Each map preferably defines opening degrees of the flow reduction valve 136 based upon vehicle speed. In addition, a different map preferably is provided depending upon whether the differential is locked, unlocked or the transmission is in two-wheel drive mode.

In the presently preferred arrangement, three maps are provided. In the illustrated arrangement, each of the maps reflects an opening angle a of the flow reduction valve 136 on the y-axis and the vehicle speed on the x-axis. Other suitable map arrangements also can be used. Each of the maps preferably comprise three speed regions to the associated curve. The first region provides a gain of 1 for operation between zero and about 15 mph. The second region provides a functional relationship between gain and vehicle speed. In a most preferred arrangement, the second region provides a linear relationship in which gain is decreased as vehicle speed changes from about 15 mph to about 30 mph. The third region provides a gain of slightly more than zero for operation about 30 mph. In this region, maximum bypass is provided to limit the flow through the spool valve 50. In this manner, maximum gain can be provided as slower speeds and the steering can be less twitchy at higher speeds.

In another configuration, the controller 130 can sense vehicle speed and can output a signal to vary the flow rate created by the pump 110. In particular, when the vehicle is stopped or moving very slowly, the pump 110 can provide a high flow rate such that a large gain is provided by the power assist arrangement. When the vehicle speed increases, the flow rate is either steadily reduced or stepped down to a lower flow rate such that the gain provided by the power assist arrangement is greatly reduced. Such a configuration greatly enhances vehicle stability and feel. It is anticipated that any suitable pump can be used that would allow a variable throughput of fluid.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An all terrain vehicle comprising:
   a frame assembly, a pair of dirigible front wheels connected to said frame assembly, an engine disposed within a central portion of said frame assembly, a seat supported by said frame assembly and positioned generally above said engine;
   said engine selectively powering said front wheels through a front wheel drive assembly, said front wheel drive assembly comprising a lockable differential;
   a handle bar assembly positioned forward of said seat, said handle bar assembly comprising a pair of transversely spaced grips connected to a steering column, said steering column having a limited rotational range of less than about 270 degrees;
   a power steering cylinder comprising a cylinder body that is connected to said frame assembly, said cylinder body defining a pair of cylinder chambers separated by a piston, a piston rod extending from said cylinder body and being connected to said piston at one end and being operably connected to said steering column at another end;

said steering column being fixed for rotation with an input shaft of a power steering valve, said power steering valve forming a portion of a closed loop power steering fluid system;

said power steering valve comprising a spool and an output shaft, said input shaft and said output shaft being connected with a torsion bar, said output shaft being adapted for connection to said front wheels;

said spool being connected to said output shaft such that rotation of said output shalt relative to said input shaft results in said power steering valve opening and flow in said closed loop being directed into or out of said cylinder chambers to effect movement of said piston rod;

said closed loop power steering system further comprising a bypass passage that diverts flow from around said spool valve, a flow regulator being disposed within said bypass passage; and a controller being adapted to control said flow regulator depending upon a sensed vehicle operating speed and a sensed differential lock mode.

2. The vehicle of claim 1, wherein said controller controls said flow regulator to increase flow through said bypass passage when said vehicle speed increases.

3. The vehicle of claim 1, wherein said controller controls said flow regulator to increase flow through said bypass passage when said four wheel drive assembly is in an unlocked differential mode.

4. The vehicle of claim 3, wherein said controller controls said flow regulator to further increase flow through said bypass passage when said four wheel drive assembly is in a two wheel drive mode.

5. The vehicle of claim 1, wherein said controller controls said flow regulator to allow flow according to different control maps depending upon said sensed vehicle operating speed.

6. The vehicle of claim 5, wherein said controller controls said flow regulator according to three distinct control maps corresponding to three distinct vehicle operating speed ranges.

7. The vehicle of claim 6, wherein said three distinct vehicle operating speed ranges are below about 15 mph, about 15 mph to about 30 mph and above about 30 mph.

8. An all terrain vehicle comprising a steerable wheel, a frame supported by said steerable wheel, an engine supported by said frame, a seat disposed generally above said engine, a handle bar assembly pivotally attached to said frame, said handle bar assembly comprising a lock-to-lock sweep of between about 30 degrees and 180 degrees, a flow control valve connected to said handle bar assembly, a pitman arm connected to said flow control valve and a linkage extending between said pitman arm and said steerable wheel, a hydraulic cylinder extending between said frame and at least one of said flow control valve, said pitman arm and said linkage, a fluid tank connected to said flow control valve with a pressure line, a pump interposed along said pressure line between said flow control valve and said tank, said valve also being connected to said tank with a return line, and said flow control valve being connected to said hydraulic cylinder.

9. The vehicle of claim 8 further comprising a bypass passage extending between said pressure line and said return line but not passing through said flow control valve.

10. The vehicle of claim 9, wherein a flow rate through said flow control valve can be decreased by increasing flow through said bypass passage.

11. The vehicle of claim 10 further comprising a controller, said controller being connected to a speed sensor, said speed sensor adapted to detect an operating speed of said vehicle, said controller also being connected to a flow regulator, said flow regulator being disposed along said bypass passage, said controller being adapted to vary a flow rate through said bypass passage by adjusting said flow regulator based at least in part upon vehicle speed.

12. The vehicle of claim 11 further comprising a lockable front wheel differential, a differential lock sensor being adapted to detect whether said differential is in a locked mode and said controller being adapted to vary a flow rate through said bypass passage by adjusting said flow regulator based at least in part upon said differential lock mode.

13. The vehicle of claim 8, wherein the flow control valve comprises a rotational servo valve.

14. The vehicle of claim 13, wherein a cantilever post connects the rotational servo valve to the fram assembly.

15. The vehicle of claim 14, wherein the cantilever post is welded to the frame assembly.

16. The vehicle of claim 13, wherein the rotational servo valve comprises an input shaft and an output shaft, the handle bar assembly comprises a steering column, the steering column comprising a lower portion and the input shaft being secured to the lower portion of the steering column.

17. The vehicle of claim 16, wherein the input shaft is mechanically coupled to the lower portion of the steering column.

18. The vehicle of claim 17, wherein a splined coupling sleeve joins the input shaft and the lower portion of the steering volumn.

19. The vehicle of claim 16, wherein the output shaft is connected to the pitman arm.

20. The vehicle of claim 19, wherein a coupling sleeve joins the output shaft to the pitman arm.

21. The vehicle of claim 20, wherein a stub shaft extending from the pitman arm is received by the coupling sleeve.

22. The vehicle of claim 21, wherein the coupling sleeve comprises a mounting flange and the hydraulic cylinder comprises a ram and the ram is secured to the mounting flange.

23. The vehicle of claim 22, wherein the hydraulic cylinder comprises a cylinder body and the cylinder body is secured to the frame assembly.

24. The vehicle of claim 22, wherein the ram extends in a generally longitudinal direction of the vehicle.

25. The vehicle of claim 22, wherein the mounting flange extends generally laterally outward when the handle bar assembly is in a generally neutral position.

26. The vehicle of claim 8, wherein the tank is positioned generally within a flow of air during movement of the vehicle.

27. The vehicle of claim 26, wherein the handle bar assembly comprises a steering column and the tank is positioned forward of the steering column.

28. The vehicle of claim 8, wherein the flow control valve comprises a rotational servo valve, the rotational servo valve comprises an input shaft and an output shaft, and a torsion bar connects the input shaft and output shaft.

29. The vehicle of claim 28, wherein the input shaft and the output shaft are capable of direct a direct engagement condition and wherein the input shaft and the output shaft are capable of about 8 degrees of relative rotation prior to the direct engagement condition.

30. The vehicle of claim 28, wherein the input shaft and the output shaft are capable of direct a direct engagement condition and wherein the input shaft and the output are capable of about 5 degrees of relative rotation prior to the direct engagement condition.

31. The vehicle of claim 28, wherein the input shaft and the output shaft are capable of direct a direct engagement condition and wherein the input shaft and the output shaft are capable of about 4 degrees of relative rotation prior to the direct engagement condition.

32. A method of controlling a power steering system for a recreational vehicle, said method comprising sensing a first vehicle speed, controlling flow characteristics in said power steering system to provide a first flow rate of fluid within a closed loop hydraulic path, sensing a second vehicle speed, comparing said first vehicle speed to said second vehicle speed, controlling flow characteristics in said power steering system to provide a second flow rate of fluid wherein said first flow rate is higher than said second flow rate if said first vehicle speed is lower than said second vehicle speed and said first flow rate is lower than said second flow rate if said first vehicle speed is higher than said second vehicle speed, and sensing a lock state if a lockable transmission and varying said first flow rate and said second flow rate based upon said sensed lock state.

33. The method of claim 32, wherein said power steering system comprises a servo valve and a bypass passage, said bypass passage being configured to reduce a flow rate of fluid through said servo valve, said method comprising controlling said flow characteristics by altering a rate of flow through said bypass passage.

34. The method of claim 33 further comprising comparing said detected operating speed of said vehicle to a predetermined high-speed threshold and maximizing flow through said bypass passage if said detected operating speed is higher than said predetermined high-speed threshold.

35. A power steering system for use on all terrain vehicle, said power steering system comprising:

a power steering cylinder comprising a cylinder body defining a pair of cylinder chambers separated by a piston, a piston rod extending from said cylinder body and being connected to said piston at one end and being operably connected to a steering column at another end;

an input shaft of a power steering valve being adapted for connection to said power steering column, said power steering valve forming a portion of a closed loop power steering fluid system;

said power steering valve comprising a spool and an output shaft, said input shaft and said output shaft being connected with a torsion bar, said output shaft being adapted for connection to a steerable wheel;

said spool being connected to said output shaft such that rotation of said output shaft relative to said input results in said power steering valve opening and flow in said closed loop being directed into or out of said cylinder chambers to effect movement of said piston rod;

said closed loop power steering system further comprising a bypass passage that diverts flow from around said spool valve, a flow regular being disposed within said bypass passage; and a controller being adapted to control said flow regulator depending upon a sensed vehicle operating speed and a sensed differential lock mode.

36. The power steering system of claim 35 further comprising a pump disposed along said close loop, said pump being adapted for generating a substantially constant flow rate.

37. The power steering system of claim 36, wherein said pump is adapted to be powered by electricity generated by the vehicle.

38. The power steering system of claim 35, wherein said input shaft and said output shaft are adapted for direct engagement after about 4 degrees of relative movement.

* * * * *

UNITED STATES PATENT AND TRADEMARK OFFICE
CERTIFICATE OF CORRECTION

PATENT NO. : 7,070,019 B2
APPLICATION NO. : 10/178903
DATED : July 4, 2006
INVENTOR(S) : David T. Takamoto et al.

It is certified that error appears in the above-identified patent and that said Letters Patent is hereby corrected as shown below:

Title page (56)
On Page 1, Col. 1 (References cited – U.S. Patent Documents), insert the following omitted references: --5,924,520, 07/20/99, Ehara, et al.-- and --5,632,185, 05/27/97, Gassmann.--

Title Page (56)
On Page 1, Col. 1 (other publications), Line 3, Delete "®" and insert -- © --, therefor.
Title Page
On Page 2, Col. 1 (U.S. Patent Documents), After "4,702,335 A" insert -- * --.
In Col. 1, Line 14, After "particularly," insert -- the --.
In Col. 6, Line 22 (approx.), Delete "arguments," and insert -- arrangements, --, therefor.
In Col. 7, Line 2, Delete "though" and insert -- through --, therefor.
In Col. 7, Line 5, Delete "though" and insert -- through --, therefor.
In Col. 8, Line 38 (approx.), Delete "arrangement" and insert -- arrangement, --, therefor.
In Col. 9, Line 37 (approx.), Delete "tank" and insert -- tanks --, therefor.
In Col. 15, Line 9 (approx.), In Claim 1, delete "shalt" and insert -- shaft --, therefor.
In Col. 16, Line 16, In Claim 14, delete "fram" and insert -- frame --, therefor.
In Col. 16, Line 29, In Claim 18, delete "volumn." and insert -- column. --, therefor.
In Col. 16, Line 57, In Claim 28, after "and" insert -- the --.
In Col. 16, Line 65, In Claim 30, after "output" insert -- shaft --.
In Col. 17, Line 18, In Claim 32, delete "if" and insert -- of --, therefor.
In Col. 17, Line 32, In Claim 35, after "on" insert -- an --.
In Col. 18, Line 13, In Claim 35, after "input" insert -- shaft --.
In Col. 18, Line 19, In Claim 35, delete "regular" and insert -- regulator --, therefor.

Signed and Sealed this

Tenth Day of April, 2007

JON W. DUDAS
*Director of the United States Patent and Trademark Office*